United States Patent
Klemen

(10) Patent No.: US 7,364,527 B2
(45) Date of Patent: Apr. 29, 2008

(54) NINE SPEED AUTOMATIC TRANSMISSION WITH SIX TORQUE-TRANSMITTING MECHANISMS

(75) Inventor: Donald Klemen, Carmel, IN (US)

(73) Assignee: General Motors Corporation, Detroit, MI (US)

( * ) Notice: Subject to any disclaimer, the term of this patent is extended or adjusted under 35 U.S.C. 154(b) by 228 days.

(21) Appl. No.: 11/233,734

(22) Filed: Sep. 23, 2005

(65) Prior Publication Data
US 2007/0072732 A1 Mar. 29, 2007

(51) Int. Cl.
*F16H 3/44* (2006.01)

(52) U.S. Cl. .................. 475/290; 475/280; 475/302

(58) Field of Classification Search ............ 475/218, 475/219, 207, 210, 329, 330, 302, 271, 269, 475/275, 276, 277, 278, 279, 280, 282, 284, 475/286, 288, 290
See application file for complete search history.

(56) References Cited

U.S. PATENT DOCUMENTS

| | | | | |
|---|---|---|---|---|
| 3,941,013 A | * | 3/1976 | Miller | 475/276 |
| 4,395,925 A | * | 8/1983 | Gaus | 475/278 |
| 4,683,776 A | | 8/1987 | Klemen | 74/765 |
| 5,503,604 A | * | 4/1996 | Pierce et al. | 475/276 |
| 5,954,613 A | * | 9/1999 | Park | 475/275 |
| 6,176,803 B1 | * | 1/2001 | Meyer et al. | 475/286 |
| 7,014,589 B2 | * | 3/2006 | Stevenson | 475/284 |
| 7,226,381 B2 | * | 6/2007 | Klemen | 475/275 |
| 2004/0242366 A1 | * | 12/2004 | Tabata et al. | 475/275 |
| 2006/0223666 A1 | * | 10/2006 | Gumpoltsberger | 475/276 |

* cited by examiner

*Primary Examiner*—Roger Pang

(57) ABSTRACT

A multi-speed transmission that achieves nine forward speed ratios and a reverse speed ratio has two planetary gear sets and a plurality of intermeshing gear members which may consist of two additional planetary gear sets or gear members arranged in a countershaft design. A speed ratio of an equal value but with an opposite direction of rotation is achieved at one of the gear members connected with one of the planetary gear members in a reverse ratio as in a first forward speed ratio. Six torque-transmitting mechanisms are employed.

10 Claims, 7 Drawing Sheets

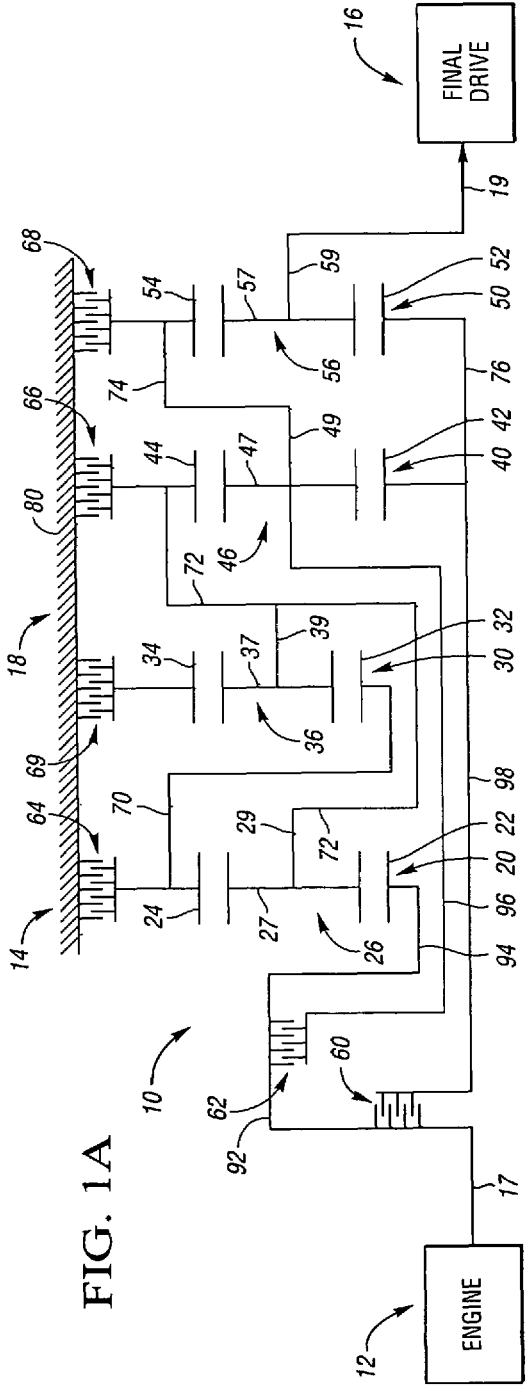

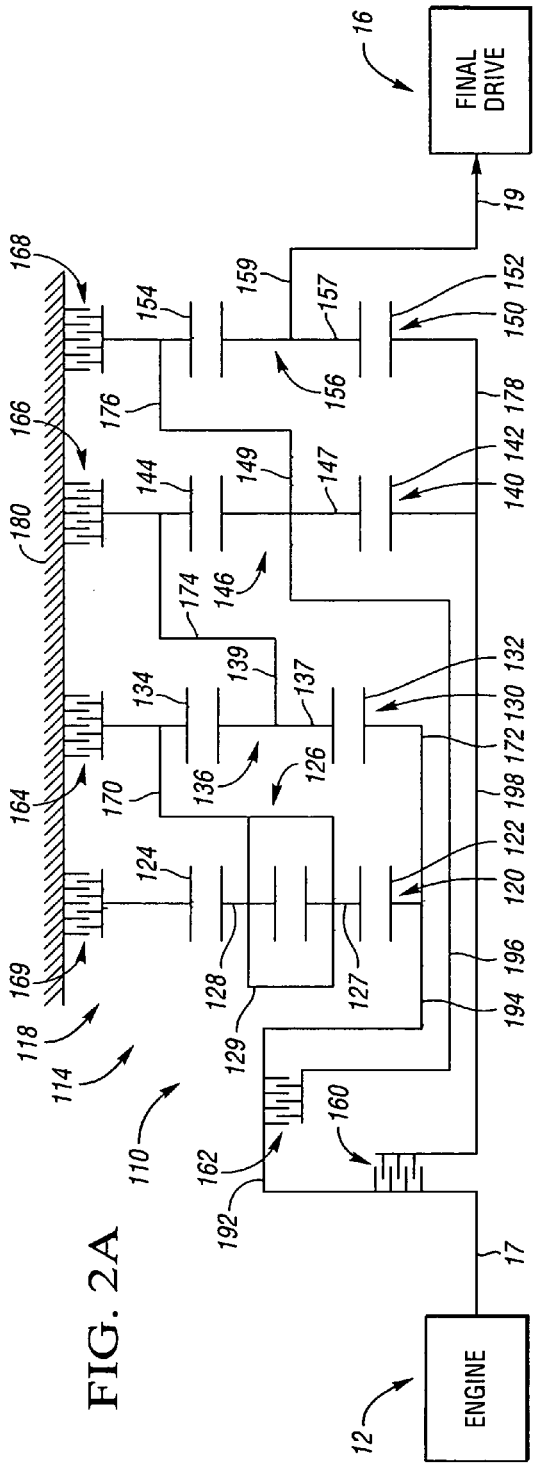
FIG. 2A
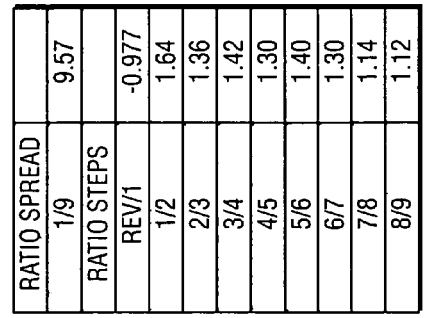
FIG. 2C
FIG. 2B

FIG. 5C

| RATIO SPREAD | 8.86 |
|---|---|
| RATIO STEPS | |
| REV/1 | -1.0 |
| 1/2 | 1.53 |
| 2/3 | 1.31 |
| 3/4 | 1.45 |
| 4/5 | 1.29 |
| 5/6 | 1.39 |
| 6/7 | 1.49 |
| 7/8 | 1.13 |
| 8/9 | 1.13 |

FIG. 5B (X = ENGAGED CLUTCH)

| | RATIOS | 460 | 462 | 464 | 466 | 468 | 469 |
|---|---|---|---|---|---|---|---|
| REVERSE | -5.23 | | | X | | X | |
| 1 | 5.23 | | | | | X | X |
| 2 | 3.41 | X | | | | X | |
| 3 | 2.60 | X | | | X | | |
| 4 | 1.80 | X | | X | | | |
| 5 | 1.39 | | X | X | | | |
| 6 | 1.00 | | X | | | | |
| 7 | 0.76 | | X | | X | | |
| 8 | 0.67 | | X | | | | |
| 9 | 0.59 | | X | | | | X |

FIG. 6C

| RATIO SPREAD | 9.14 |
|---|---|
| RATIO STEPS | |
| REV/1 | -1.0 |
| 1/2 | 1.58 |
| 2/3 | 1.33 |
| 3/4 | 1.43 |
| 4/5 | 1.29 |
| 5/6 | 1.39 |
| 6/7 | 1.49 |
| 7/8 | 1.13 |
| 8/9 | 1.12 |

FIG. 6B (X = ENGAGED CLUTCH)

| | RATIOS | 560 | 562 | 564 | 566 | 568 | 569 |
|---|---|---|---|---|---|---|---|
| REVERSE | -5.39 | | | X | | X | |
| 1 | 5.39 | | | | | X | X |
| 2 | 3.41 | X | | | | X | |
| 3 | 2.57 | X | | | X | | |
| 4 | 1.80 | X | | X | | | |
| 5 | 1.39 | | X | X | | | |
| 6 | 1.00 | | X | | | | |
| 7 | 0.76 | | X | | X | | |
| 8 | 0.67 | | X | | | | |
| 9 | 0.59 | | X | | | | X |

NINE SPEED AUTOMATIC TRANSMISSION WITH SIX TORQUE-TRANSMITTING MECHANISMS

TECHNICAL FIELD

The invention relates to a multi-speed transmission having at least two planetary gear sets and a plurality of intermeshing gears, which may be two additional planetary gear sets or a countershaft design arrangement. The transmission employs six torque-transmitting mechanisms.

BACKGROUND OF THE INVENTION

Passenger vehicles include a powertrain that is comprised of an engine, multi-speed transmission, and a differential or final drive. The multi-speed transmission increases the overall operating range of the vehicle by permitting the engine to operate through its torque range a number of times. The number of forward speed ratios that are available in the transmission determines the number of times the engine torque range is repeated. Early automatic transmissions had two speed ranges. This severely limited the overall speed range of the vehicle and therefore required a relatively large engine that could produce a wide speed and torque range. This resulted in the engine operating at a specific fuel consumption point during cruising, other than the most efficient point. Therefore, manually-shifted (countershaft transmissions) were the most popular.

With the advent of three- and four-speed automatic transmissions, the automatic shifting (planetary gear) transmission increased in popularity with the motoring public. These transmissions improved the operating performance and fuel economy of the vehicle. The increased number of speed ratios reduces the step size between ratios and therefore improves the shift quality of the transmission by making the ratio interchanges substantially imperceptible to the operator under normal vehicle acceleration.

It has been suggested that the number of forward speed ratios be increased to six or more. Six-speed transmissions are disclosed in U.S. Pat. No. 4,070,927 issued to Polak on Jan. 31, 1978; and U.S. Pat. No. 6,422,969 issued to Raghavan and Usoro on Jul. 23, 2002.

Six-speed transmissions offer several advantages over four- and five-speed transmissions, including improved vehicle acceleration and improved fuel economy. While many trucks employ power transmissions having six or more forward speed ratios, passenger cars are still manufactured with three- and four-speed automatic transmissions and relatively few five or six-speed devices due to the size and complexity of these transmissions.

Seven-speed transmissions are disclosed in U.S. Pat. No. 6,623,397 issued to Raghavan, Bucknor and Usoro. Eight speed transmissions are disclosed in U.S. Pat. No. 6,425,841 issued to Haka. The Haka transmission utilizes three planetary gear sets and six torque transmitting devices, including two brakes and two clutches, to provide eight forward speed ratios and a reverse speed ratio. One of the planetary gear sets is positioned and operated to establish two fixed speed input members for the remaining two planetary gear sets. Seven-, eight- and nine-speed transmissions provide further improvements in acceleration and fuel economy over six-speed transmissions. However, like the six-speed transmissions discussed above, the development of seven-, eight- and nine-speed transmissions has been precluded because of complexity, size and cost.

SUMMARY OF THE INVENTION

A multi-speed transmission is provided that achieves a speed ratio at a gear member that is substantially equal in magnitude but opposite in direction in a reverse ratio as in the first forward ratio. The overall reverse speed ratio of the transmission is substantially equal in magnitude and opposite in direction as the first forward speed ratio of the transmission. Preferably, gear tooth counts are selected such that the reverse and first forward ratios are relatively deep to provide good towing capacity.

The transmission has an input member, an output member, as well as first and second planetary gears set each having a first, second and third member and having at least one continuously interconnection therebetween. A plurality of intermeshing gears, at least two of which are continuously interconnected with each other, include a first, second, third, fourth, fifth and sixth gear member. The fourth gear member continuously intermeshes with or is rotatably supported by the first gear member. As used herein, "gear member" within the claimed plurality of intermeshing gear members may include a typical ring gear member, sun gear member, or pinion gear member and may also include a carrier member with supports pinion members. The output member is continuously with a member of the first planetary gear set. The first gear member is continuously connected with the input member and the second gear member is continuously interconnected with a member the second planetary gear set. A first torque-transmitting mechanism is selectively engagable to connect the third gear member with the stationary member, the input member or the fourth gear member. The second gear member rotates at a first predetermined speed ratio with respect to the input member in the first direction of rotation when the first torque-transmitting mechanism is engaged. A second torque-transmitting mechanism is selectively engagable to connect the fifth gear member with one of the stationary member, the fourth gear member and the sixth gear member. The second gear member rotates at substantially the first predetermined speed ratio with respect to the input member in an opposite direction of rotation when the second torque-transmitting mechanism in engaged. Thus, the two torque-transmitting mechanisms are utilized to establish the reverse and first forward speed ratios and provide substantially the same magnitude speed ratio at the second gear member with an opposite direction of rotation.

Six different embodiments of the invention are provided. In two of the embodiments, the plurality of intermeshing gear members are two additional planetary gear sets, so that four total planetary gear sets are utilized. In two of six preferred embodiments, the plurality of intermeshing gear members are gear members disposed between the input member and the two planetary gear sets in a countershaft design. The six exemplary preferred embodiments are additional embodiments and arrangements that achieve the same ratio results as the nine speed transmission of U.S. Pat. No. 4,683,776 issued Aug. 4, 1987 to Klemen.

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIG. 1A is a schematic representation of a powertrain including one embodiment of a transmission of the present invention having four planetary gear sets;

FIG. 1B is a truth table depicting some of the operating characteristics of the powertrain shown in FIG. 1A;

FIG. 1C is a chart depicting other operating characteristics of the powertrain shown in FIG. 1A;

FIG. 2A is a schematic representation of a powertrain having a second embodiment of a transmission of the present invention with four planetary gear sets;

FIG. 2B is a truth table depicting some of the operating characteristics of the powertrain shown in FIG. 2A;

FIG. 2C is a chart depicting other of the operating characteristics of the powertrain shown in FIG. 2A;

FIG. 5B is a truth table depicting some of the operating characteristics of the powertrain shown in FIG. 5A;

FIG. 5C is a chart depicting other operating characteristics of the powertrain shown in FIG. 5A;

FIG. 6B is a truth table depicting some of the operating characteristics of the powertrain shown in FIG. 6A; and FIG. 6C is a chart depicting other operating characteristics of the powertrain shown in FIG. 6A.

DESCRIPTION OF THE PREFERRED EMBODIMENTS

First Embodiment

Figure 3:
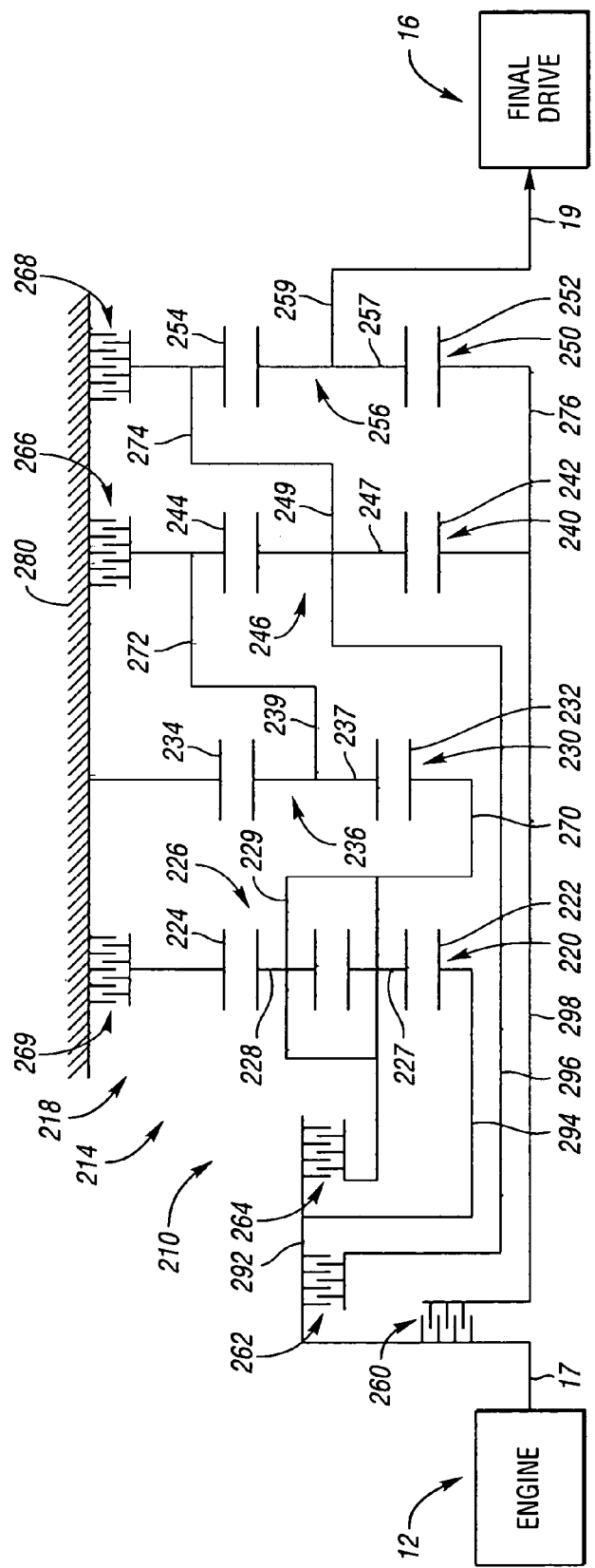
FIG. 3 is a schematic representation of a powertrain having a third embodiment of a transmission of the present invention with four planetary gear sets.

Referring to the drawings, wherein like reference numerals represent the same or corresponding parts through the several views, there is shown in FIG. 1A a first embodiment of a powertrain 10 having a conventional engine 12, a planetary transmission 14 and a conventional final drive mechanism 16. As with the other five embodiments described below, the first forward ratio of the transmission 14 is sufficiently low to permit operation without a torque converter.

The planetary transmission 14 includes an input member or shaft 17 continuously connected with the engine 12, a planetary gear arrangement 18, and an output member or shaft 19 continuously connected with the final drive mechanism 16. The planetary gear arrangement 18 includes four planetary gear sets 20, 30, 40 and 50.

The planetary gear set 20 includes a sun gear member 22, a ring gear member 24 and a planet carrier assembly member 26. The planet carrier assembly member 26 includes a plurality of pinion gears 27 rotatably mounted on a carrier member 29 and disposed in meshing relationship with both the sun gear member 22 and the ring gear member 24.

The planetary gear set 30 includes a sun gear member 32, a ring gear member 34, and a planet carrier assembly member 36. The planet carrier assembly member 36 includes a plurality of pinion gears 37 rotatably mounted on the carrier member 39 and disposed in meshing relationship with both the sun gear member 32 and the ring gear member 34.

The planetary gear set 40 includes a sun gear member 42, a ring gear member 44 and a planet carrier assembly member 46. The planet carrier assembly member 46 includes a plurality of pinion gears 47 rotatably mounted on the carrier member 49 and disposed in meshing relationship with both the sun gear member 42 and the ring gear member 44.

The planetary gear set 50 includes a sun gear member 52, a ring gear member 54, and a planet carrier assembly member 56. The planet carrier assembly member 56 includes a plurality of pinion gears 57 rotatably mounted on the carrier member 59 and disposed in meshing relationship with both the sun gear member 52 and the ring gear member 54.

The input shaft 17 is continuously connected with the sun gear member 22 via a drum 92 to which a first intermediate shaft 94 is continuously connected. The output shaft 19 is continuously connected with the carrier member 59. The ring gear member 24 is continuously connected with the sun gear member 32 through interconnecting member 70. The carrier member 29 is continuously connected with the carrier member 39 and with the ring gear member 44 through interconnecting member 72. The interconnecting member 72 may be one component or separate components. The carrier member 49 is continuously connected with the ring gear member 54 through interconnecting member 74. The sun gear member 42 is continuously connected with the sun gear member 52 through interconnecting member 76.

As referred to in the claims, the planetary gear sets from right to left are first planetary gear set 50, second planetary gear set 40, third planetary gear set 30 and fourth planetary gear set 20. Additionally, the planetary gear sets 20 and 30 make up the plurality of gear members referred to in the claims. Specifically, the six gear members of the plurality of gear members are as follows: the sun gear member 22 is the first gear member, the carrier member 39 is the second gear member, the ring gear member 24 is the third gear member, the pinion gear 27 is the fourth gear member, the ring gear member 34 is the fifth gear member, and the sun gear member 32 is the sixth gear member. In the embodiments described herein, a component may be referred to as a specific gear member number and as a same or differently numbered member of a planetary gear set (i.e., a component may be the third gear member and may be the first member of the respective planetary gear set in the claims).

The sun gear member 42 is selectively connectable with the input shaft 17 through the clutch 60 which connects the input shaft 17 to the innermost shaft 98. The planet carrier member 49 is selectively connectable with the input shaft 17 through the clutch 62, which connects the input shaft 17 to the second intermediate shaft 96. The ring gear member 24 is selectively connectable with the transmission housing 80 through the brake 64. The ring gear member 44 is selectively connectable with the transmission housing 80 through the brake 66. The ring gear member 54 is selectively connectable with the transmission housing 80 through the brake 68. The ring gear member 34 is selectively connectable with the transmission housing 80 through the brake 69. As used in the claims, the brake 64 is the first torque-transmitting mechanism and the brake 69 is the second torque-transmitting mechanism. The clutch 60 is the third torque-transmitting mechanism, the clutch 62 is the fourth torque-transmitting mechanism, the brake 66 is the fifth torque-transmitting mechanism and the brake 68 is the sixth torque-transmitting mechanism.

As shown in FIG. 1B, and in particular the truth table disclosed therein, the torque-transmitting mechanisms are selectively engaged in combinations of two to provide nine forward speed ratios and a reverse speed ratio. The torque-transmitting mechanisms 60, 62, 64, 66, 68 and 69 are preferably of the multiple disk-type, fluid actuated friction-drive establishing device which are commonly used in planetary gear transmissions. The torque-transmitting mechanisms 60 and 62 are rotating type torque-transmitting mechanisms, commonly termed clutches and the torque-transmitting mechanisms 64, 66, 68 and 69 are stationary type torque-transmitting mechanisms, commonly termed brakes or reaction clutches.

The reverse speed ratio is established with the engagement of the brakes 64 and 68. The brake 64 connects the ring gear member 24 with the transmission housing 80, and the brake 68 connects the ring gear member 54 with the transmission housing 80. The sun gear member 22 rotates at the same speed as the input shaft 17. The carrier members 29 and 39 rotate at the same speed as the ring gear member 44. The ring gear member 24 and the sun gear member 32 do not rotate. The carrier member 29 rotates at a speed determined from the speed of the sun gear member 22 and the ring gear/sun gear tooth ratio of the planetary gear set 20. The carrier member 49 and the ring gear member 54 do not rotate. The sun gear member 42 rotates at the same speed as the sun gear member 52. The sun gear member 42 rotates at a speed determined from the speed of the ring gear member 44 and the ring gear/sun gear tooth ratio of the planetary gear set 40. The carrier member 59 rotates at the same speed as the output shaft 19. The carrier member 59, and therefore the output shaft 19, rotates at a speed determined from the speed of the sun gear member 52 and the ring gear/sun gear tooth ratio of the planetary gear set 50. The numerical value of the reverse speed ratio is determined utilizing the ring gear/sun gear tooth ratios of the planetary gear sets 20, 40 and 50. Application of the clutch 64 to hold the ring gear member 24 stationary (and the sun gear member 32 stationary via the interconnecting member 70) cause the carrier member 39 to rotate in the same direction as the input shaft 17. Assuming the following gear member tooth counts the speed ratio at the carrier member 39 is +0.375: the sun gear member 22 has 73 teeth, the pinion gear 27 has 26 teeth, the ring gear member 24 has 125 teeth, the sun gear member 32 has 57 teeth, the pinion gear 37 has 33 teeth, and the ring gear member 34 has 123 teeth.

The first forward speed ratio is established with the engagement of the brakes 68 and 69. The brake 68 connects the ring gear member 54 with the transmission housing 80, and the brake 69 connects the ring gear member 34 with the transmission housing 80. The sun gear member 22 rotates at the same speed as the input shaft 17. The carrier member 29 and the carrier member 39 rotate at the same speed as the ring gear member 44. The ring gear member 24 rotates at the same speed as the sun gear member 32. The ring gear member 24 rotates at a speed determined from the speed of the carrier member 29, the speed of the sun gear member 22 and the ring gear/sun gear tooth ratio of the planetary gear set 20. The ring gear member 34 does not rotate. The carrier member 39 rotates at a speed determined from the speed of the sun gear member 32 and the ring gear/sun gear tooth ratio of the planetary gear set 30. The carrier member 49 and the ring gear member 54 do not rotate. The sun gear member 42 rotates at the same speed as the sun gear member 52. The sun gear member 42 rotates at a speed determined from the speed of the ring gear member 44 and ring gear/sun gear tooth ratio of the planetary gear set 40. The carrier member 59 rotates at the same speed as the output shaft 19. The carrier member 59, and therefore the output shaft 19, rotates at a speed determined from the speed of the sun gear member 52 and the ring gear/sun gear tooth ratio of the planetary gear set 50. The numerical value of the first forward speed ratio is determined utilizing the ring gear/sun gear tooth ratios of the planetary gear sets 20, 30, 40 and 50.

The sun gear member 22 rotates in the same direction as the input shaft 17 while the carrier member 29 and the ring gear member 24 rotate in an opposite direction. Because the carrier member 29 is continuously connected to the carrier member 39 by the interconnecting member 72, the carrier member 39 also rotates in an opposite direction than the input member 17. With the tooth ratios described above, the speed ratio of the carrier member 39 is −0.375. Thus, the speed ratio achieved of the carrier member 39 is equal in magnitude but opposite in direction in the first forward speed ratio as compared to the reverse speed ratio.

The second forward speed ratio is established with the engagement of the clutch 60 and the brake 68. The clutch 60 connects the input member 17 with the sun gear member 42, and the brake 68 connects the ring gear member 54 with the transmission housing 80. The sun gear members 22, 42 and 52 rotate at the same speed as the input shaft 17. The carrier members 29 and 39 rotate at the same speed as the ring gear member 44. The ring gear member 24 rotates at the same speed as the sun gear member 32. The ring gear member 24 rotates at a speed determined from the speed of the carrier member 29, the speed of the sun gear member 22 and the ring gear/sun gear tooth ratio of the planetary gear set 20. The carrier member 49 and the ring gear member 54 do not rotate. The ring gear member 44 rotates at a speed determined from the speed of the sun gear member 42 and the ring gear/sun gear tooth ratio of the planetary gear set 40. The carrier member 59 rotates at the same speed as the output shaft 19. The carrier member 59, and therefore the output shaft 19, rotates at a speed determined from the speed of the sun gear member 52 and the ring gear/sun gear tooth ratio of the planetary gear set 50. The numerical value of the second forward speed ratio is determined utilizing the ring gear/sun gear tooth ratios of the planetary gear sets 20, 40 and 50.

The third forward speed ratio is established with the engagement of the clutch 60 and the brake 69. The clutch 60 connects the input shaft 17 with the sun gear members 42 and 52. The brake 69 connects the ring gear member 34 with the transmission housing 80. The sun gear members 22, 42, and 52 rotate at the same speed as the input member 17. The carrier member 29 and the carrier member 39 rotate at the same speed as the ring gear member 44. The ring gear member 24 rotates at the same speed as the sun gear member 32. The ring gear member 24 rotates at a speed determined from the speed of the carrier member 29, the speed of the sun gear member 22 and the ring gear/sun gear tooth ratio of the planetary gear set 20. The ring gear member 34 does not rotate. The carrier member 39 rotates at a speed determined from the speed of the sun gear member 32 and the ring gear/sun gear tooth ratio of the planetary gear set 30. The carrier member 49 rotates at the same speed as the ring gear member 54. The carrier member 49 rotates at a speed determined from the speed of the ring gear member 44, the speed of the sun gear member 42 and the ring gear/sun gear tooth ratio of the planetary gear set 40. The carrier member 59 rotates at the speed as the output shaft 19. The carrier member 59, and therefore the output shaft 19, rotates at a speed determined from the speed of the ring gear member 54, the speed of the sun gear member 52 and the ring gear/sun gear tooth ratio of the planetary gear set 50. The numerical value of the third forward speed ratio is determined utilizing the ring gear/sun gear tooth ratios of the planetary gear sets 20, 30, 40 and 50.

The fourth forward speed ratio is established with the engagement of the clutch 60 and the brake 66. The clutch 60 connects the input shaft 17 with the sun gear member 42 (and sun gear member 52 via the interconnecting member 76). The brake 66 connects the ring gear member 44 with the transmission housing 80. The sun gear members 22, 42 and 52 rotate at the same speed as the input shaft 17. The carrier members 29 and 39 and the ring gear member 44 do not rotate. The ring gear member 24 rotates at the same speed as the sun gear member 32. The ring gear member 24 rotates at a speed determined from the speed of the sun gear member 22 and the ring gear/sun gear tooth ratio of the planetary gear set 20. The carrier member 49 rotates at the same speed as the ring gear member 54. The carrier member 49 rotates at a speed determined from the speed of the sun gear member 42 and the ring gear/sun gear tooth ratio of the planetary gear set 40. The carrier member 59 rotates at the same speed as the output shaft 19. The carrier member 59, and therefore the output shaft 19, rotates at a speed determined from the speed of the ring gear member 54, the speed of the sun gear member 52 and the ring gear/sun gear tooth ratio of the planetary gear set 50. The numerical value of the fourth forward speed ratio is determined utilizing the ring gear/sun gear tooth ratios of the planetary gear sets 40 and 50.

The fifth forward speed ratio is established with the engagement of the clutch 60 and the brake 64. The clutch 60 connects the input shaft 17 with the sun gear members 42 (and sun gear member 52 via the interconnecting member 76), and the brake 64 connects the ring gear member 24 with the transmission housing 80. The sun gear members 22, 42 and 52 rotate at the same speed as the input shaft 17. The carrier members 29 and 39 rotate at the same speed as the ring gear member 44. The ring gear member 24 and the sun gear member 32 do not rotate. The carrier member 29 rotates at a speed determined from the speed of the sun gear member 22 and the ring gear/sun gear tooth ratio of the planetary gear set 20. The carrier member 49 rotates at the same speed as the ring gear member 54. The carrier member 49 rotates at a speed determined from the speed of the ring gear member 44, the speed of the sun gear member 42 and the ring gear/sun gear tooth ratio of the planetary gear set 40. The carrier member 59 rotates at the same speed as the output shaft 19. The carrier member 59, and therefore the output shaft 19, rotates at a speed determined from the speed of the ring gear member 54, the speed of the sun gear member 52 and the ring gear/sun gear tooth ratio of the planetary gear set 50. The numerical value of the fifth forward speed ratio is determined utilizing the ring gear/sun gear tooth ratios of the planetary gear sets 20, 40 and 50.

The sixth forward speed ratio is established with the engagement of the clutches 60 and 62. The clutch 60 connects the input shaft 17 with the sun gear members 42 and 52. The clutch 62 connects the input shaft 17 with the carrier member 49. In this configuration, the sun gear members 22, 42 and 52 as well as the carrier member 49 and the ring gear member 54 rotate at the same speed as the input shaft 17. Because the ring gear member 54 and the sun gear member 52 rotate at the speed of the input shaft 17, the carrier member 59, and therefore the output shaft 19, also rotate at the same speed as the input shaft 17. Accordingly, in this configuration, the input shaft 17 and the output shaft 19 rotate at the same speed, and the numerical value of the sixth forward speed ratio is 1.

The seventh forward speed ratio is established with the engagement of the clutch 62 and the brake 64. The clutch 62 connects the input shaft 17 with the carrier member 49, and the brake 64 connects the ring gear member 24 with the transmission housing 80. The sun gear member 22, the carrier member 49, and the ring gear member 54 rotate at the same speed as the input member 17. The carrier member 29 and the carrier member 39 rotate at the same speed as the ring gear member 44. The ring gear member 24 and the sun gear member 32 do not rotate. The carrier member 29 rotates at a speed determined from the speed of the sun gear member 22 and the ring gear/sun gear tooth ratio of the planetary gear set 20. The sun gear member 42 rotates at the same speed as the sun gear member 52. The sun gear member 42 rotates at a speed determined from the speed of the ring gear member 44, the speed of the carrier member 49 and the ring gear/sun gear tooth ratio of the planetary gear set 40. The carrier member 59 rotates at the same speed as the output shaft 19. The carrier member 59, and therefore the output shaft 19, rotates at a speed determined from the speed of the ring gear member 54, the speed of the sun gear member 52 and the ring gear/sun gear tooth ratio of the planetary gear set 50. The numerical value of the seventh forward speed ratio is determined utilizing the ring gear/sun gear tooth ratios of the planetary gear sets 20, 40 and 50.

The eighth forward speed ratio is established with the engagement of the clutch 62 and the brake 66. The clutch 62 connects the input shaft 17 with the carrier member 49, and the brake 66 connects the ring gear member 44 with the transmission housing 80. The sun gear member 22, the carrier member 49 and the ring gear member 54 rotate at the same speed as the input shaft 17. The carrier members 29, 39 and the ring gear member 44 do not rotate. The ring gear member 24 rotates at the same speed as the sun gear member 32. The ring gear member 24 rotates at a speed determined from the speed of the sun gear member 22 and the ring gear/sun gear tooth ratio of the planetary gear set 20. The sun gear member 42 rotates at the same speed as the sun gear member 52. The sun gear member 42 rotates at a speed determined from the speed of the carrier member 49 and the ring gear/sun gear tooth ratio of the planetary gear set 40. The carrier member 59 rotates at the same speed as the output shaft 19. The carrier member 59, and therefore the output shaft 19, rotates at a speed determined from the speed ring gear member 54, the speed of the sun gear member 52 and the ring gear/sun gear tooth ratio of the planetary gear set 50. The numerical value of the eighth forward speed ratio is determined utilizing the ring gear/sun gear tooth ratios of the planetary gear set 40.

The ninth forward speed ratio is established with the engagement of the clutch 62 and the brake 69. The clutch 62 connects the input shaft 17 with the carrier member 49 and the brake 69 connects the ring gear member 34 with the transmission housing 80. The sun gear member 22, the carrier member 49 and the ring gear member 54 rotate at the same speed as the input shaft 17. The carrier members 29 and 39 rotate at the same speed as the ring gear member 44. The ring gear member 24 rotates at the same speed as the sun gear member 32. The ring gear member 24 rotates at a speed determined from the speed of the carrier member 29, the speed of the sun gear member 22 and the ring gear/sun gear tooth ratio of the planetary gear set 20. The carrier member 39 rotates at a speed determined from the speed of the sun gear member 32 and the ring gear/sun gear tooth ratio of the planetary gear set 30. The sun gear member 42 rotates at the same speed as the sun gear member 52. The sun gear member 42 rotates at a speed determined from the speed of the ring gear member 44, the speed of the carrier member 49 and the ring gear/sun gear tooth ratio of the planetary gear set 40. The carrier member 59 rotates at the same speed as the output shaft 19. The carrier member 59, and therefore the output shaft 19, rotates at a speed determined from the speed of the ring gear member 54, the speed of the sun gear member 52 and the ring gear/sun gear tooth ratio of the planetary gear set 50. The numerical value of the ninth forward speed ratio is determined utilizing the ring gear/sun gear tooth ratios of the planetary gear sets 20, 30, 40 and 50.

As set forth above, the engagement schedule for the torque-transmitting mechanisms is shown in the truth table of FIG. 1B. This truth table also provides an example of speed ratios that are available utilizing the ring gear/sun gear tooth ratios given by way of example in FIG. 1B. With the gear tooth counts discussed above, the tooth ratio of the planetary gear set 20 is 1.71; the tooth ratio of the planetary gear set 30 is 2.16; the tooth ratio of the planetary gear set 40 is 1.70 and the tooth ratio of the planetary gear set 50 is 2.51.

Also, the chart of FIG. 1C describes the ratio steps that are attained utilizing the sample tooth ratios given. For example, the step ratio between the first and second forward speed ratios is 1.59 while the step ratio between the Reverse ratio and the first forward speed ratio is –0.11. It should be noted that the single and double step forward ratio interchanges as well as the forward/reverse interchange are of the single transition variety.

Second Embodiment

FIG. 2A shows a powertrain 110 having a conventional engine 12, a planetary transmission 114. The planetary transmission 114 includes an input shaft 17 continuously connected with the engine 12, a planetary gear arrangement 118, and an output shaft 19 continuously connected with the final drive mechanism 16. The planetary gear arrangement 118 includes four planetary gear sets 120, 130, 140 and 150.

The planetary gear set 120 includes a sun gear member 122, a ring gear member 124 and a planet carrier assembly member 126. The planet carrier assembly member 126 is of the compound type and includes a plurality of pinion gears 127 rotatably mounted on the carrier member 129 and disposed in meshing relationship with the sun gear member 122 and pinion gears 128. The pinion gears 128 are disposed in meshing relationship with the pinion gears 127 and the ring gear member 124.

The planetary gear set 130 includes a sun gear member 132, a ring gear member 134 and a planet carrier assembly member 136. The planet carrier assembly member 136 includes a plurality of pinion gears 137 rotatably mounted on the carrier member 139 disposed in meshing relationship with both the sun gear member 132 and the ring gear member 134.

The planetary gear set 140 includes a sun gear member 142, a ring gear member 144 and a planet carrier assembly member 146. The planet carrier assembly member 146 includes a plurality of pinion gears 147 rotatably mounted on the carrier member 149 and disposed in meshingly relationship with both the sun gear member 142 and ring gear member 144.

The planetary gear set 150 includes a sun gear member 152, a ring gear member 154 and a planet carrier assembly member 156. The planet carrier assembly member 156 includes a plurality of pinion gears 157 rotatably mounted on the carrier member 159 and disposed in meshing relationship with both the sun gear member 152 and the ring gear member 154.

The planetary gear arrangement 118 also includes six torque-transmitting mechanisms 160, 162, 164, 166, 168 and 169. The torque-transmitting mechanisms 160 and 162 are rotating type torque-transmitting mechanisms, commonly termed clutches. The torque-transmitting mechanisms 164, 166, 168 and 169 are stationary type torque-transmitting mechanisms, commonly termed brakes or reaction clutches.

The input shaft 17 is continuously connected with the sun gear member 122 via a drum 192 and first intermediate shaft 194, and the output shaft 19 is continuously connected with the carrier member 159. The carrier member 129 is continuously connected with the ring gear member 134 through the interconnecting member 170. The sun gear member 122 is continuously connected with the sun gear member 132 through the interconnecting member 172. The carrier member 139 is continuously connected with the ring gear member 144 through the interconnecting member 174. The carrier member 149 is continuously connected with the ring gear member 154 through the interconnecting member 176. The sun gear member 142 is continuously connected with the sun gear member 152 through the interconnecting member 178.

The sun gear member 142 (and therefore the sun gear member 152 due to the interconnecting member 178) is selectively connectable with the input shaft 17 through the clutch 160 via an innermost shaft 198. The carrier member 149 is selectively connectable with the input shaft 17 through the clutch 162 via a second intermediate shaft 196. The ring gear member 134 is selectively connectable with the transmission housing 180 through the brake 164. The ring gear member 144 is selectively connectable with the transmission housing 180 through the brake 166. The ring gear member 154 is selectively connectable with the transmission housing 180 through the brake 168. The ring gear member 124 is selectively connectable with the transmission housing 180 through the brake 169.

As referred to in the claims, the brake 164 is the first torque-transmitting mechanism, the brake 169 is the second torque-transmitting mechanism, the clutch 160 is the third torque-transmitting mechanism, the clutch 162 is the fourth torque-transmitting mechanism, the brake 166 is the fifth torque-transmitting mechanism, and the brake 168 is the sixth torque-transmitting mechanism. Additionally, the planetary gear sets are ordered from right to left as first, second, third and fourth planetary gear sets, 150, 140, 130 and 120 respectively. With respect to the plurality of gear members referred to in the claims, the sun gear member 122 is the first gear member, the carrier member 139 is the second gear member, the ring gear member 134 is the third gear member, the pinion gear 127 is the fourth gear member, the ring gear member 124 is the fifth gear member and the sun gear member 132 is the sixth gear member. With respect to the numbering of members of the planetary gear sets 120, 130, the sun gear member 122 is the first member of the planetary gear set 120, the carrier member 129 is the second member of the planetary gear set 120 and the ring gear member 124 is the third member of the planetary gear set 120. Similarly, the carrier member 139 is first member of the planetary gear set 130. The sun gear member 132 and the ring gear member 134 are the second and third members, in either order, of the planetary gear set 130.

Notably, as indicated in the truth table of FIG. 2B, the torque-transmitting mechanisms 164 and 168 are engaged to establish the reverse speed ratio and the torque-transmitting mechanisms 168 and 169 are engaged to establish the first forward speed ratio. Assuming the following tooth members: the sun gear member 122 having 67 teeth, the pinion gears 127, 128 each having 26 teeth, the ring gear member 124 having 125 teeth, the sun gear member 132 having 73 teeth, the pinion gear 137 having 26 teeth and the ring gear member 134 having 125 teeth, in the reverse speed ratio, with the ring gear member 134 and the carrier member 139 held stationary by application of the brake 164 and with the sun gear member 122, 132 continuously interconnected, the carrier member 139 rotates at a speed ratio of +0.375 with respect to the input member 17. In the first forward speed ratio, with the application of the brakes 168 and 169, the ring gear member 124 is held stationary, the carrier member 129 rotates at the same speed as the ring gear member 134 and the sun gear members 122 and 132 rotates at the same speed. Thus, the carrier member 139 has a speed ratio of −0.371 with respect to the input member 17; i.e., the speed ratio of the carrier member 139 is substantially the same in magnitude but has an opposite direction as in the reverse speed ratio.

The truth table of FIG. 2B describes the engagement sequence utilized to provide nine forward speed ratios and a reverse speed ratio in the planetary gear arrangement 118 shown in FIG. 2A. As shown and described above for the configuration of FIG. 1A, those skilled in the art will understand from the truth table of FIG. 2B how the speed ratios shown are established through the planetary gear sets 120, 130, 140 and 150.

The truth table of FIG. 2B also provides an example of the transmission speed ratios that can be attained with the planetary gear sets shown in FIG. 2A utilizing the following sample tooth ratios: the value of the tooth ratio of the planetary gear set 120 is 1.86; the value of the tooth ratio of the planetary gear set 130 is 1.71; the value of the tooth ratio of the planetary gear set 140 is 1.70; and the value of the tooth ratio of the planetary gear set 150 is 2.51.

Also shown in FIG. 2C are the ratio steps between the single step ratios in the forward direction as well as the reverse to first forward speed ratio step. For example, the first to second step ratio is 1.64. It should also be noted that the single step and double step forward ratio interchanges as well as the forward/reverse interchange are of the single transition variety.

Third Embodiment

Turning to FIG. 3, a powertrain 210 includes the engine 12, a planetary transmission 214 and a final drive mechanism 16. The planetary transmission 214 includes an input shaft 17 continuously connected with the engine 12, a planetary gear arrangement 218, and an output shaft 19 continuously connected with the final drive mechanism 16. The planetary gear arrangement 218 includes four planetary gear sets 220, 230, 240, and 250.

The planetary gear set 220 includes a sun gear member 222, a ring gear member 224 and a planet carrier assembly member 226. The planet carrier assembly member 226 is of the compound planetary type and includes pinion gears 227 and 228 rotatably mounted on a carrier member 229. The pinion gear 227 is disposed in meshing relationship with the sun gear member 222 and the pinion gear 228. The pinion gear 228 is disposed in meshing relationship with the pinion gear 227 and the ring gear member 224.

The planetary gear set 230 includes a sun gear member 232, a ring gear member 234 and a planet carrier assembly member 236. The planet carrier assembly member 236 includes a plurality of pinion gears 237 rotatably mounted on a carrier member 239 and disposed in meshing relationship with both the sun gear member 232 and the ring gear member 234.

The planetary gear set 240 includes a sun gear member 242, a ring gear member 244 and a planet carrier assembly member 246. The planet carrier assembly member 246 includes a plurality of pinion gears 247 rotatably mounted on a carrier member 249 and disposed in meshing relationship with both the sun gear member 242 and the ring gear member 244.

The planetary gear set 250 includes a sun gear member 252, a ring gear member 254, and a planet carrier assembly member 256. The planet carrier assembly member 256 includes a plurality of pinion gears 257 rotatably mounted on a carrier member 259 and disposed in meshing relationship with both the sun gear member 252 and the ring gear member 254.

The planetary gear arrangement 218 also includes six torque-transmitting mechanisms 260, 262, 264, 266, 268, and 269. The torque-transmitting mechanisms 260, 262, and 264 are rotating type torque-transmitting mechanisms, commonly termed clutches. The torque-transmitting mechanisms 266, 268 and 269 are stationary type torque-transmitting mechanisms, commonly termed brakes or reaction clutches.

The input shaft 17 is continuously connected with the sun gear member 222 via a drum 292 and first intermediate shaft 294. The output shaft 19 is continuously connected with the carrier member 259. The carrier member 229 is continuously connected with the sun gear member 232 through the interconnecting member 270. The carrier member 239 is continuously with the ring gear member 244 through the interconnecting member 272. The carrier member 249 is continuously connected with the ring gear member 254 through the interconnecting member 274. The sun gear member 242 is continuously connected with the sun gear member 252 through the interconnecting member 276.

The sun gear member 242 (and therefore the sun gear member 252) is selectively connectable with the input shaft 17 through the clutch 260 via an innermost shaft 298. The carrier member 247 is selectively connectable with the input shaft 17 through the clutch 262 via a second intermediate shaft 296. The carrier member 229 is selectively connectable with the input shaft 17 through the clutch 264. The ring gear member 244 is selectively connectable with the transmission housing 280 through the brake 266. The ring gear member 254 is selectively connectable with the transmission housing through the brake 268. The ring gear member 224 is selectively connectable with the transmission housing 280 through the brake 269.

As referred to in the claims, the clutch 264 is the first torque-transmitting mechanism, the brake 269 is the second torque-transmitting mechanism, the clutch 260 is the third torque-transmitting mechanism, the clutch 262 is the fourth torque-transmitting mechanism, the brake 266 is the fifth torque-transmitting mechanism and the brake 268 is the sixth torque-transmitting mechanism. Additionally, the planetary gear sets are ordered from right to left as first, second, third and fourth planetary gear sets, 250, 240, 230 and 220, respectively. With respect to the plurality of gear members referred to in the claims, the sun gear member 222 is the first gear member, the carrier member 239 is the second gear member, the carrier member 229 is the third gear member, the pinion gear 227 is the fourth gear member, the ring gear member 224 is the fifth gear member and the sun gear member 232 is the sixth gear member. With respect to the numbering of members of the planetary gear sets, the sun gear member 222 is the first member, the carrier member 229 is the second member and the ring gear member 224 is the third member of the planetary gear set 220. The carrier member 239 is the first member of the planetary gear set 230 and the sun gear member 232 and ring gear member 234 are the second and third members.

The torque-transmitting mechanisms 260, 262, 264, 266, 268 and 269 are engaged in like order and sequence as similarly numbered torque-transmitting mechanisms of the truth tables of FIGS. 1B and 2B to establish a reverse speed ratio and nine forward speed ratios. The torque-transmitting mechanisms 264 and 268 are engaged to establish the reverse speed ratio and the torque-transmitting mechanisms 268 and 269 are engaged to establish the first forward speed ratio. Assuming the following tooth numbers for the planetary gear set 220 and 230: sun gear member 222 having 63 teeth, pinion gears 227, 228 each having 28 teeth, ring gear member 224 having 125 teeth, sun gear member 232 having 73 teeth, pinion gear 237 having 26 teeth and ring gear member 234 having 125 teeth, then in the reverse speed ratio, with the input shaft 17 directly connected with the sun gear member 222, and also with the carrier member 229 which is continuously connected with the sun gear member 232, all members of the planetary gear set 220 and the sun gear member 232 rotate in the same direction and the same speed as the input shaft 17. The carrier member 239 rotates at a speed ratio of +0.375 with respect to the input shaft 17. In the first forward speed ratio, with the ring gear member 224 held stationary, the carrier member 239 rotates at a speed ratio of −0.375 with respect to the input member 17. That is, the carrier member 239 rotates in the opposite direction but at substantially same magnitude speed ratio in the first forward speed as in the reverse speed ratio.

Fourth Embodiment

Figure 4:
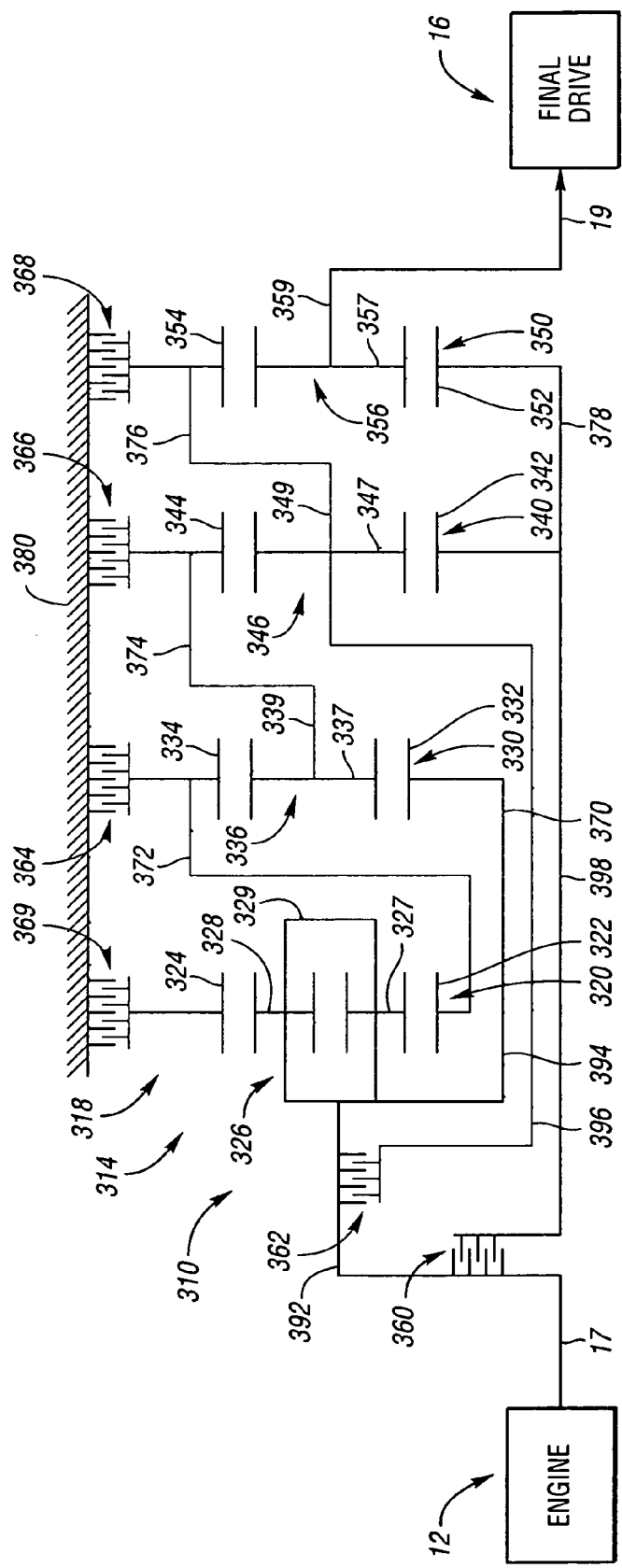
FIG. 4 is a schematic representation of a powertrain having a fourth embodiment of a transmission of the present invention having four planetary gear sets.

Turning to FIG. 4, a powertrain 310 includes the engine 12, a planetary transmission 314 and a final drive mechanism 16. The planetary transmission 314 includes an input shaft 17 continuously connected with the engine 12, a planetary gear arrangement 318, and an output shaft 19 continuously connected with the final drive mechanism 16. The planetary gear arrangement 318 includes four planetary gear sets 320, 330, 340 and 350.

The planetary gear set 320 includes a sun gear member 322, a ring gear member 324 and a planet carrier assembly member 326. The planet carrier assembly member 326 is of the compound type and includes a plurality of pinion gears 327 rotatably mounted on a carrier member 329 and disposed in meshing relationship with the sun gear member 322 and with pinion gears 328. The pinion gears 328 are disposed in meshing relationship with the pinion gears 327 and the ring gear member 324.

The planetary gear set 330 includes a sun gear member 332, a ring gear member 334 and a planet carrier assembly member 336. The planet carrier assembly member 336 includes pinion gears 337 rotatably mounted on a carrier member 339 disposed in meshing relationship with both the sun gear member 332 and the ring gear member 334.

The planetary gear set 340 includes a sun gear member 342, a ring gear member 344 and a planet carrier assembly member 346. The planet carrier assembly member 346 includes a plurality of pinion gears 347 rotatably mounted on a carrier member 349 disposed in meshing relationship with both the sun gear member 342 and the ring gear member 344.

The planetary gear set 350 includes a sun gear member 352, a ring gear member 354 and planet carrier assembly member 356. The planet carrier assembly member 356 includes a plurality of pinion gears 357 rotatably mounted on a carrier member 359 and disposed in meshing relationship with both the sun gear member 352 and the ring gear member 354.

The planetary gear arrangement 318 also includes six torque-transmitting mechanisms 360, 362, 364, 366, 368 and 369. The torque-transmitting mechanisms 360 and 362 are rotating type torque-transmitting mechanisms, commonly termed clutches. The torque-transmitting mechanisms 364, 366, 368 and 369 are stationary type torque-transmitting mechanism, commonly termed brakes or reaction clutches.

The input shaft 17 is continuously connected with the carrier member 329, and the output shaft 19 is continuously connected with the carrier member 359. The carrier member 329 is continuously connected with the sun gear member 332 through the interconnecting member 370 which may also be referred to as outermost sleeve 394. The sun gear member 322 is continuously connected with the ring gear member 334 through the interconnecting member 372. The carrier member 349 is continuously connected with the ring gear member 354 through the interconnecting member 376. The sun gear member 342 is continuously connected with the sun gear member 352 through the interconnecting member 378.

The input shaft 17 is selectively connectable with the sun gear member 342 (and therefore the sun gear member 352 via the interconnecting member 378) through the clutch 360 which connects the input shaft 17 to the sun gear member 342 by an innermost shaft 398. The input shaft 17 is selectively connectable with the carrier member 349 by application of the clutch 362 which connects the input shaft 17 to the intermediate shaft 396.

As referred to in the claims, the planetary gear sets 320 and 330 include the plurality of gear members. The carrier member 329 is the first gear member, the carrier member 339 is the second gear member, the ring gear member 334 is the third gear member, the pinion gear 327 is the fourth gear member, the ring gear member 324 is the fifth gear member and the sun gear member 332 is the sixth gear member. With respect to the first, second and third gear members referred to in the claims for the planetary gear sets 320 and 330, the carrier member 329 is the first member, the sun gear member 322 is the second member and the ring gear member 324 is the third member of the planetary gear set 320. The carrier member 339 is the first member of the planetary gear set 330, and the sun gear member 332 and ring gear member 334 are the second and third members of the planetary gear set 330. With respect to the torque-transmitting mechanisms of the transmission 314 in the claims, the brake 369 is the first torque-transmitting mechanism, the brake 364 is the second torque-transmitting mechanism, the clutch 360 is the third torque-transmitting mechanism, the clutch 362 is the fourth torque-transmitting mechanism, the brake 366 is the fifth torque-transmitting mechanism, and the brake 368 is the sixth torque-transmitting mechanism.

Notably, although no truth table is present for the transmission 314, the torque-transmitting mechanisms are engaged in like order as similarly numbered torque-transmitting mechanisms of the truth tables of FIGS. 1B and 2B to establish a reverse speed ratio and nine forward speed ratios. The torque-transmitting mechanisms 364 and 368 are engaged to establish the reverse speed ratio and the torque-transmitting mechanisms 368 and 369 are engaged to establish the first forward speed ratio. Assuming the following gear tooth numbers: the sun gear member 322 having 58 teeth, pinion gears 327, 328 each having 31 teeth, ring gear member 324 having 125 teeth, sun gear member 332 having 73 teeth, pinion gear 337 having 26 teeth and ring gear member 334 having 125 teeth, in the reverse speed ratio, with the ring gear member 334 and therefore the sun gear member 322 held stationary, the carrier member 339 rotates in the same direction as the input shaft 17 with a speed ratio of 0.375. In the first forward speed ratio, with the ring gear member 324 held stationary, the carrier member 339 rotates at a speed ratio of −0.361, i.e., in an opposite direction with substantially the same magnitude as in the reverse speed ratio.

Fifth Embodiment

Figure 5A:
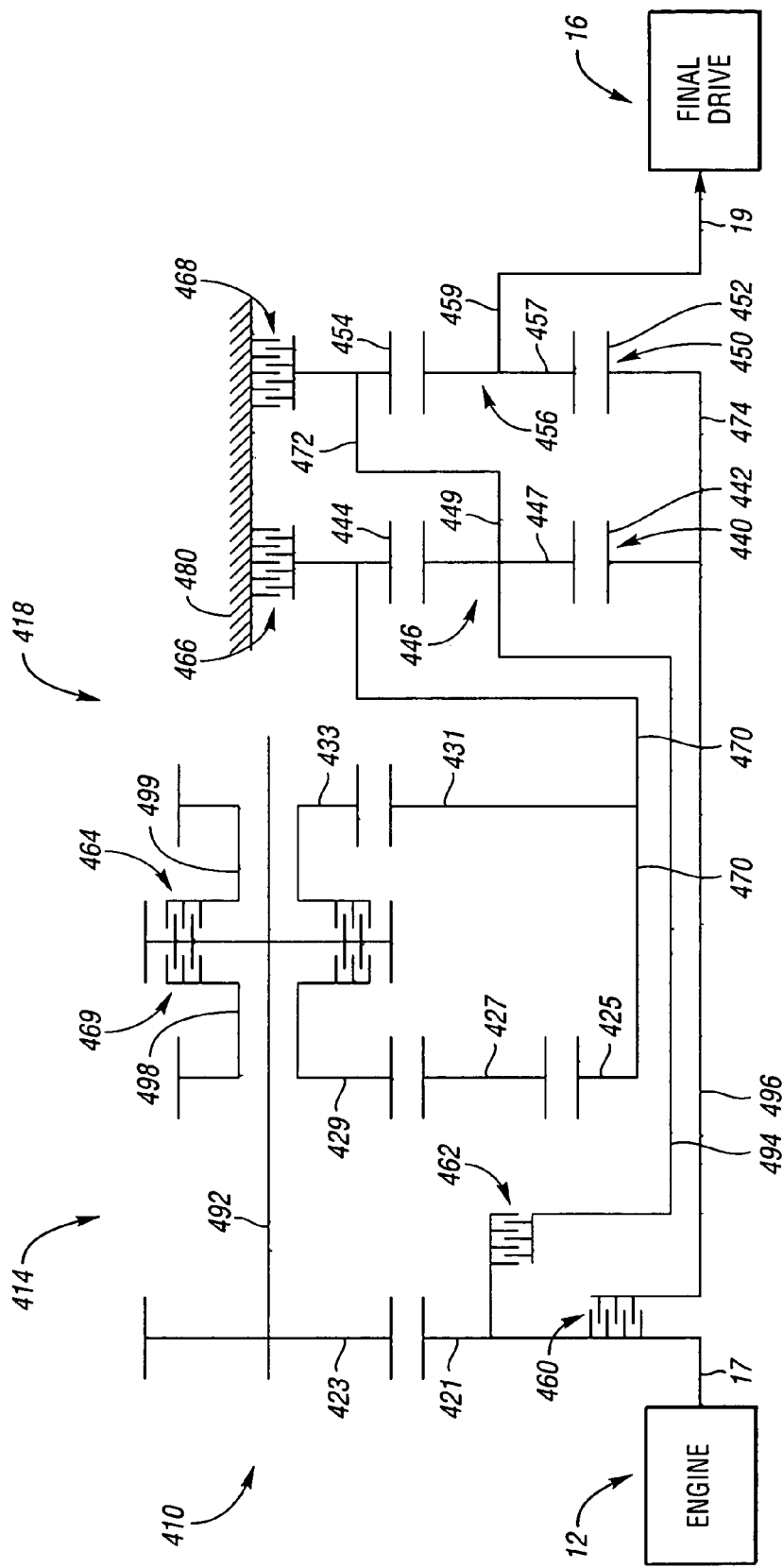
FIG. 5A is a schematic representation of a powertrain having a fifth embodiment of a transmission of the present invention utilizing two planetary gear sets and a plurality of intermeshing gears arranged in a countershaft design.

Turning to FIG. 5A, a powertrain 410 includes the engine 12, a planetary transmission 414 and a final drive mechanism 16. The planetary transmission 414 includes an input shaft 17 continuously connected with the engine 12, a planetary gear arrangement 418, and an output shaft 19 continuously connected with the final drive mechanism 16. The planetary gear arrangement 418 includes two planetary gear sets 440 and 450.

The planetary gear set 440 includes a sun gear member 442, a ring gear member 444 and a planet carrier assembly member 446. The planet carrier assembly member 446 includes a plurality of pinion gears 447 rotatably mounted on a carrier member 449 and disposed in meshing relationship with both the sun gear member 442 and the ring gear member 444.

The planetary gear set 450 includes a sun gear member 452, a ring gear member 454 and a planet carrier assembly member 456. The planet carrier assembly member 456 includes a plurality of pinion gears 457 rotatably mounted on a carrier member 459 and disposed in meshing relationship with both the sun gear member 452 and the ring gear member 454.

A plurality of intermeshing gear members is arranged between the input shaft 17 and the planetary gear sets 440 and 450. Specifically, gear member 421 is continuously connected with the input member 17 and intermeshes with gear member 423 which rotates with a countershaft 492. A torque-transmitting mechanism 460 is selectively engagable to connect the gear member 421 and input member 17 with the sun gear member 442 via an innermost shaft 496. A torque-transmitting mechanism 462 is selectively engagable to connect the gear member 421 and input shaft 17 with the carrier member 449 via an intermediate shaft 494. Sleeve shafts 498 and 499 concentrically rotate about the countershaft 492. Gear member 429 rotates with the sleeve shaft 498. Gear member 433 rotates with sleeve shaft 499. Torque-transmitting mechanism 469 is selectively engagable to connect the sleeve shaft 498 and therefore the gear member 429 with the countershaft 492 for common rotation therewith. Similarly, torque-transmitting mechanism 464 is selectively engagable to connect the sleeve shaft 499 and gear member 433 to the countershaft 492 for common rotation therewith. When the torque-transmitting mechanism 469 is engaged, torque is transferred from the countershaft 492 to the gear member 427, which intermeshes with gear member 429, and to gear member 425, which intermeshes with gear member 427. When the torque-transmitting mechanism 464 is engaged, torque is transferred from the countershaft 492 to gear member 431, which intermeshes with gear member 433. The gear members 425 and 431 rotate with interconnecting member 470, by which they are continuously interconnected with the ring gear member 444. Interconnecting member 470 may be one component or separate components. Carrier member 449 is continuously connected with ring gear member 454 through the interconnecting member 472. Sun gear member 442 is continuously connected with the sun gear member 452 through the interconnecting member 474.

As referred to in the claims, gear member 421 is the first gear member of the plurality of gear members. The gear member 431 is the second gear member, gear member 433 is the third gear member, gear member 423 is the fourth gear member, and gear member 429 is the fifth gear member. Gear member 422 is the sixth gear member and gear member 427 is the seventh gear member. With respect to the numbering of the torque-transmitting mechanisms in the claims, the clutch 464 is the first torque-transmitting mechanism, the clutch 469 is the second torque-transmitting mechanism, the clutch 460 is the third torque-transmitting mechanism, the clutch 462 is the fourth torque-transmitting mechanism, the brake 466 is the fifth torque-transmitting mechanism, and the brake 468 is the sixth torque-transmitting mechanism. Additionally, the planetary gear set 450 is considered the first planetary gear set, and the planetary gear set 440 is considered the second planetary gear set.

The truth table of FIG. 5B describes the engagement sequence utilized to provide nine forward speed ratios and a reverse speed ratio in the transmission 414 shown FIG. 5A. The truth table of FIG. 5B also provides an example of the ratios that can be attained with the transmission 414 shown in FIG. 5A utilizing the following sample tooth numbers: gear member 421 has 50 teeth, gear member 423 has 50 teeth, gear member 429 has 20 teeth, gear member 427 has 20 teeth, gear member 425 has 52 teeth, gear member 431 has 67 teeth, and gear member 433 has 25 teeth. To establish the reverse speed ratio, the torque-transmitting mechanisms 464 and 468 are engaged. With the engagement of the torque-transmitting mechanism 464, torque is transferred from the input shaft 17 through the intermeshing gears 421 and 423 to the gear member 433 which is engaged with the countershaft 492 for common rotation therewith by application of the torque-transmitting mechanism 464. The gear member 433 intermeshes with the gear member 431 to transfer torque to the ring gear member 444. The power flow through the first and second planetary gear sets 440 and 450 will be well understood by those skilled in the art based upon the description of the transmission 14 with respect to FIG. 1A. With the gear tooth counts described above, the speed ratio at the gear member 431 (which is the second gear member of the claims) is +0.373 with respect to the input shaft 17.

To establish the first forward speed ratio, the torque-transmitting mechanisms 469 and 468 are engaged. With the engagement of torque-transmitting mechanism 469 (which is the second torque-transmitting mechanism referred to in the claims), torque is transferred from the input shaft 17 through the intermeshing gear members 421 and 423 to the countershaft 492 and to the gear member 429 by engagement of sleeve shaft 498 for common rotation with the countershaft 492. Torque flows through the gear member 429 to intermeshing gear member 427 and intermeshing gear member 425 to the ring gear member 444 through the interconnecting member 470. In the first forward speed ratio, the ratio of the gear member 431 which rotates with the interconnecting member 470 is −0.385; i.e., substantially the same magnitude but opposite in direction than with the reverse speed ratio. Establishment of the remaining second through ninth forward speed ratios is described in the truth table of FIG. 5B. Those skilled in the art will readily understand the power flow through the transmission 414 with the engagement schedule illustrated in FIG. 5B. The reverse transmission speed ratio of −5.23 and first forward transmission speed ratio of 5.23 achieved by the transmission 414 are illustrated in the truth table of FIG. 5B. Additionally, FIG. 5C indicates that a ratio spread of 8.86 is achieved by the transmission 414 and various ratio steps, such as a step of 1.53 between the first and second forward speed ratios, are also achieved.

Sixth Embodiment

Figure 6A:
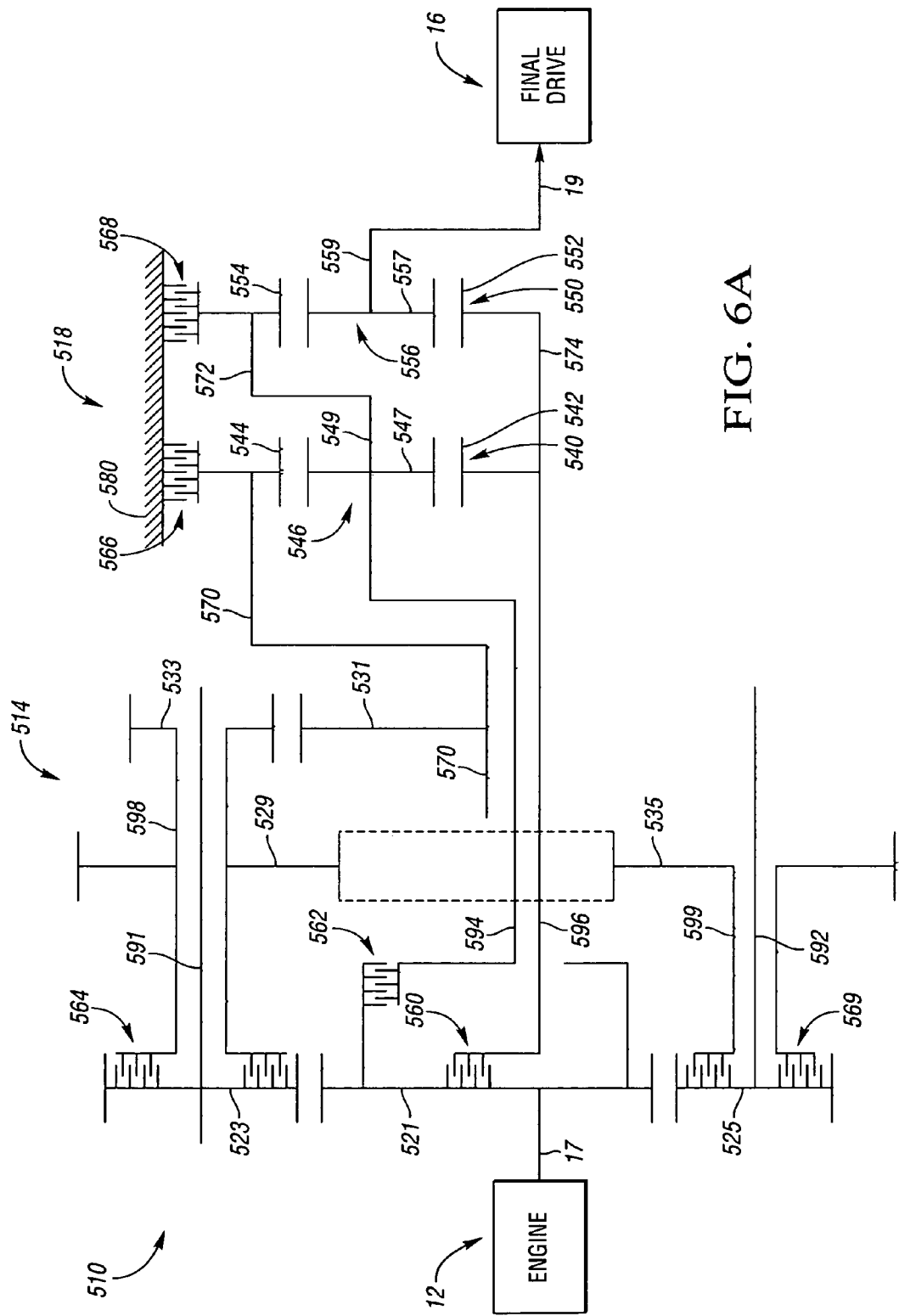
FIG. 6A is a schematic representation of a powertrain incorporating a sixth embodiment of a transmission of the present invention having two planetary gear sets and a plurality of intermeshing gears arranged in a countershaft design.

Turning to FIG. 6A, a powertrain 510 includes the engine 12, a transmission 514 and a final drive mechanism 16. The transmission 514 includes an input shaft 17 continuously connected with the engine 12, a planetary gear arrangement 518, and an output shaft 19 continuously connected with the final drive mechanism 16. The planetary gear arrangement 518 includes two planetary gear sets 540 and 550.

The planetary gear set 540 includes a sun gear member 542, a ring gear member 544 and planet carrier assembly member 546. The planet carrier assembly member 546 includes a plurality of pinion gears 547 rotatably mounted on a carrier member 549 disposed in meshing relationship with both the sun gear member 542 and ring gear member 544.

The planetary gear set 550 includes a sun gear member 552, a ring gear member 554 and a planet carrier assembly member 556. The planet carrier assembly member 556 includes a plurality of pinion gears 557 rotatably mounted on a carrier member 559 and disposed in meshing relationship with both the sun gear member 552 and the ring gear member 554. As referred to in the claims, the planetary gear set 550 is the first planetary gear set and the planetary gear set 540 is the second planetary gear set.

A plurality of intermeshing gears are disposed between the input shaft 17 and the planetary gear sets 540 and 550. Specifically, a first gear member 521 is continuously connected with the input shaft 17 and intermeshes a gear member 523 which is connected for common rotation with a first countershaft 591. Another gear member 525 also intermeshes with the gear member 521. The gear member 525 is connected for common rotation with the second countershaft 592. A sleeve shaft 598 is concentrically arranged about the first countershaft 591 and has a gear member 533 connected thereto for common rotation. The gear member 533 continuously intermeshes with a gear member 531. The gear member 531 rotates with an interconnecting member 570 which is also continuously connected to the ring gear member 544. Similarly, a sleeve shaft 599 is concentrically arranged about the second countershaft 592 and has a gear member 535 connected for common rotation therewith. The gear member 535 also intermeshes with gear member 529 which is connected to the sleeve shaft 598 for common rotation therewith (the intermeshing of gear member 535 and gear member 529 is illustrated by dashed lines). The torque-transmitting mechanism 564 which is referred to as the first torque-transmitting mechanism in the claims, is selectively engagable to connect the gear member 523 for common rotation with the sleeve shaft 598 and thereby transfer torque from the first gear member 521 to gear member 523 and gear members 529 and 533. Likewise, a torque-transmitting mechanism 569 which is referred to as the second torque-transmitting mechanism in the claims is selectively engagable to connect the gear member 525 with the sleeve shaft 599 for common rotation therewith and thereby transfer torque from the gear member 525 to gear member 529 through the gear member 535. Another torque-transmitting mechanism 560, which is a clutch and is referred to as the third torque-transmitting mechanism in the claims, is selectively engagable to connect the input shaft 17 and gear member 521 with an innermost shaft 596 which is continuously connected with the sun gear members 542 and 552. A torque-transmitting mechanism 562 which is referred to as the fourth torque-transmitting mechanism in the claims, is selectively engagable to connect the input shaft 17 and gear member 521 to an intermediate sleeve shaft 594 and to the carrier member 549 which is continuously connected thereto. A fifth torque-transmitting mechanism 566 is selectively engagable to connect the ring gear member 544 with a stationary transmission housing 580. A sixth torque-transmitting mechanism 568 is selectively engagable to connect ring gear member 554 with the transmission housing 580. An interconnecting member 572 continuously connects the carrier member 549 with the ring gear member 554. An interconnecting member 574 continuously connects the sun gear member 542 with the sun gear member 552.

As referred to in the claims, with respect to the plurality of intermeshing gear members, gear member 521 is the first gear member, gear member 531 is the second gear member, gear member 533 is the third gear member, gear member 523 is the fourth gear member, gear member 535 is the fifth gear member, and gear member 525 may be the sixth gear member.

The truth table of FIG. 6B describes the engagement sequence utilized to provide nine forward speed ratios and a reverse speed ratio in the transmission 514 shown in FIG. 6A. The truth table of FIG. 6B also provides an example of the ratios that can be obtained with the transmission 514 shown in FIG. 6A utilizing the following sample tooth counts: gear member 521 has 50 teeth, gear member 523 has 50 teeth, gear member 529 has 50 teeth, gear member 533 has 25 teeth, gear member 531 has 67 teeth, gear member 525 has 50 teeth, gear member 535 has 50 teeth.

To establish the reverse speed ratio shown in FIG. 6B, the torque-transmitting mechanisms 564 and 568 are engaged. With engagement of torque-transmitting mechanism 564 torque is transferred from the input shaft 17 through the intermeshing gears 521 and 523 to sleeve shaft 598 and gear members 529 and 533. Gear 533 intermeshes with gear member 531 to transfer torque to the interconnecting member 570. The speed ratio of gear member 531 is +0.373 with respect to the input shaft 17 in the reverse speed ratio.

To establish the first forward speed ratio, the torque-transmitting mechanisms 569 and 568 are engaged. With engagement of the torque-transmitting mechanism 569 torque is transferred from gear member 525 to the sleeve shaft 599. Thus, torque is transferred from the input shaft 17 through the intermeshing gear members 521 and 525 to sleeve shaft 599 and thereby to gear member 535, gear member 529, gear member 533 and gear member 531 to interconnecting member 570 which continuously rotates therewith. Thus, with the sample gear tooth numbers discussed above, torque is provided at the gear member 531 at a ratio −0.373 with respect to the input shaft 17. Accordingly, substantially the same magnitude but an opposite direction is achieved in speed ratio at the gear member 531 between the reverse and first forward speed ratios. Referring to the truth table of FIG. 6B, it is illustrated that the reverse speed ratio of the transmission is −5.39 and the first forward speed ratio of the transmission is 5.39. The second through ninth forward speed ratios illustrated in FIG. 6B and the power flow that is necessary to achieve such ratios will be well understood by those skilled in the art based upon the explanation of the reverse and first forward speed ratios as well as the speed ratios with respect to FIG. 1A.

Referring to FIG. 6C, an overall ratio spread between the first and ninth forward speed ratio of 9.14 is achieved with the transmission 514 of FIG. 6A. Additionally, ratio steps between the adjacent forward speed ratios as well as between the reverse and first speed ratios are illustrated.

Each of the above six exemplary preferred embodiment of transmissions achieve a speed ratio at a gear member in substantially the same value but opposite rotational direction in a reverse speed ratio as in the first forward speed ratio. Nine overall forward speed ratios are achieved in each exemplary embodiment. Each has two planetary gear sets and a plurality of intermeshing gears which make either the additional two planetary gear sets or gears arranged in a countershaft design.

While the best modes for carrying out the invention have been described in detail, those familiar with the art to which this invention relates will recognize various alternative designs and embodiments for practicing the invention within the scope of the appended claims.

The invention claimed is:

1. A multi-speed transmission comprising:
   an input member;
   an output member;
   a first and a second planetary gear set each having first, second, and third members, and having at least one continuous interconnection therebetween;
   a plurality of intermeshing gear members at least two of which are continuously interconnected with each other, including a first, a second, a third, a fourth, a fifth and a sixth gear member, said fourth gear member continuously intermeshing with or being rotatably supported by said first gear member;
   wherein said output member is continuously connected with a member of said first planetary gear set; wherein said first gear member is continuously connected with said input member, wherein said second gear member is continuously interconnected with a member of said second planetary gear set;
   a first torque transmitting mechanism selectively engageable to connect said third gear member with one of a stationary member, said input member and said fourth gear member, said second gear member rotating at a first predetermined speed ratio with respect to said input member in a first direction of rotation when said first torque-transmitting mechanism is engaged; and
   a second torque-transmitting mechanism selectively engageable to connect said fifth gear member with one of said stationary member, said fourth gear member and said sixth gear member, said second gear member rotating at substantially said first predetermined speed ratio with respect to said input member in an opposite direction of rotation when said second torque-transmitting mechanism is engaged.

2. The multi-speed transmission of claim 1, further comprising:
   a third torque-transmitting mechanism selectively engagable to connect said input member with a member of said first planetary gear set;
   a fourth torque-transmitting mechanism selectively engagable to connect said input member with a member of said second planetary gear set;
   a fifth torque-transmitting mechanism selectively engagable to connect a member of said second planetary gear set with said stationary member; and
   a sixth torque-transmitting mechanism selectively engagable to connect a member of said first planetary gear set with said stationary member;
   wherein selective engagement of said torque-transmitting mechanisms provides nine forward speed ratios and a reverse speed ratio between said input member and said output member.

3. The multi-speed transmission of claim 1, further comprising:
   another torque-transmitting mechanism selectively engagable to connect a member of said first planetary gear set with said stationary member;
   wherein selective engagement of said second and said another torque-transmitting mechanism provides a first forward speed ratio and selective engagement of said first and said another torque-transmitting mechanism provides a reverse speed ratio of substantially equivalent numerical value as said first forward speed ratio.

4. The multi-speed transmission of claim 1, wherein said first, second and third members of said planetary gear sets include a sun gear member, a ring gear member and a carrier member;
   wherein said at least one continuous interconnection between said first and second planetary gear sets includes an interconnecting member continuously interconnecting said carrier member of said second planetary gear set with said ring gear member of said first planetary gear set and another interconnecting member continuously interconnecting said sun gear member of said first planetary gear set with said sun gear member of said second planetary gear set.

5. The multi-speed transmission of claim 4, wherein said second gear member is continuously interconnected with said ring gear member of said second planetary gear set.

6. The multi-speed transmission of claim 1, wherein said plurality of intermeshing gear members include a third and a fourth planetary gear set each having a ring gear member, a sun gear member, and a carrier member;
   wherein said carrier member of said fourth planetary gear set is continuously connected with a member of said third planetary gear set.

7. The multi-speed transmission of claim 1, further comprising:
   a countershaft displaced from said input and output members, one of said plurality of intermeshing gears being continuously connected with said countershaft for rotation therewith and intermeshing with said first gear member;
   said selective engagement of one of said first and second torque-transmitting mechanisms thereby connecting said third gear member and said fifth gear member, respectively, with said countershaft for rotation therewith, to thereby transfer torque to cause said second gear member to rotate at said first predetermined speed.

8. A multi-speed transmission comprising:
   an input member;
   an output member;
   a first, a second, a third and a fourth planetary gear set, each having a first, a second and a third member;
   wherein said output member is connected to said first member of said first planetary gear set; wherein one of said members of said first planetary gear set is continuously interconnected with one of said members of said second planetary gear set; wherein another of said members of said second planetary gear set is continuously interconnected with said first member of said third planetary gear set;

wherein said input member is continuously connected with said first member of said fourth planetary gear set; wherein said second member of said fourth planetary gear set is continuously interconnected with one of said members of said third planetary gear set;

wherein said first, second and third members of each of said planetary gear sets include a sun gear member, a ring gear member and a carrier member;

wherein said carrier member of said fourth planetary gear set is continuously interconnected with said carrier member of said third planetary gear set;

wherein said ring gear member of said fourth planetary gear set is continuously interconnected with said sun gear member of said third planetary gear set;

a first torque-transmitting mechanism selectively engagable for operatively connecting one of said second and third members of said fourth planetary gear set with one of a stationary member and said input member, said member of said fourth planetary gear set operatively connected by said first torque-transmitting mechanism also being continuously interconnected with a member of said third planetary gear set; and a second torque-transmitting mechanism selectively engagable for operatively connecting one of said members of said third or fourth planetary gear set with said stationary member;

wherein said first member of said third planetary gear set rotates at a first predetermined speed ratio with respect to said input member in a first direction of rotation when said first torque-transmitting mechanism is engaged and rotates substantially at said first predetermined speed ratio in a direction of rotation opposite said first direction when said second torque-transmitting mechanism is so engaged.

9. The multi-speed transmission of claim 8, further comprising:
a third torque-transmitting mechanism selectively engagable to connect said input member with a member of said first planetary gear set;
a fourth torque-transmitting mechanism selectively engagable to connect said input member with a member of said second planetary gear set;
a fifth torque-transmitting mechanism selectively engagable to connect a member of said second planetary gear set with said stationary member; and
a sixth torque-transmitting mechanism selectively engagable to connect a member of said first planetary gear set with said stationary member;
wherein selective engagement of said torque-transmitting mechanisms provides nine forward speed ratios and a reverse speed ratio between said input member and said output member.

10. The multi-speed transmission of claim 8, further comprising:
another torque-transmitting mechanism selectively engagable to connect a member of said first planetary gear set with said stationary member;
wherein selective engagement of said second and said another torque-transmitting mechanism provides a first forward speed ratio and selective engagement of said first and said another torque-transmitting mechanism provides a reverse speed ratio of substantially equivalent numerical value as said first forward speed ratio.

* * * * *